(12) United States Patent
Gosioco

(10) Patent No.: US 10,137,756 B2
(45) Date of Patent: Nov. 27, 2018

(54) ROTARY DOOR FOR VENTILATION APPARATUS AND VENTILATION APPARATUS HAVING THE ROTARY DOOR

(71) Applicants: DENSO International America, Inc., Southfield, MI (US); DENSO CORPORATION, Kariya, Aichi-pref. (JP)

(72) Inventor: Delomer Gosioco, Royal Oak, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 100 days.

(21) Appl. No.: 14/661,384

(22) Filed: Mar. 18, 2015

(65) Prior Publication Data

US 2016/0274592 A1 Sep. 22, 2016

(51) Int. Cl.
*B60H 1/00* (2006.01)

(52) U.S. Cl.
CPC ............ *B60H 1/00678* (2013.01); *B60H 2001/00707* (2013.01); *B60H 2001/00721* (2013.01)

(58) Field of Classification Search
CPC .............................. B60H 1/00; B60H 1/00678
USPC ................................... 454/155, 333
See application file for complete search history.

(56) References Cited

U.S. PATENT DOCUMENTS

| 7,340,800 | B2 * | 3/2008 | Gulley | E05D 11/02 16/273 |
| 7,563,159 | B2 * | 7/2009 | Newman | B60H 1/0005 165/156 |
| 2007/0293135 | A1 * | 12/2007 | Hori | B60H 1/00678 454/121 |

FOREIGN PATENT DOCUMENTS

JP 2008-296685 A 12/2008

* cited by examiner

*Primary Examiner* — Steven B McAllister
*Assistant Examiner* — Samantha Probst

(57) ABSTRACT

A rotary door includes a shaft and a deflector. The shaft defines an inner passage and has axial ends defining at least one end opening. The deflector extends from the shaft. The shaft has a peripheral opening communicating with the at least one end opening through the inner passage.

13 Claims, 9 Drawing Sheets

ROTARY DOOR FOR VENTILATION APPARATUS AND VENTILATION APPARATUS HAVING THE ROTARY DOOR

TECHNICAL FIELD

The present disclosure relates to a door for a ventilation apparatus. The present disclosure relates to a ventilation apparatus having the rotary door.

BACKGROUND

Conventionally, a ventilation apparatus such as a heating, ventilation, and air conditioning (HVAC) apparatus may be required to have a downsized structure. To the contrary, a ventilation apparatus may be desirable to have an additional channel to conduct air from the ventilation apparatus to an outside of the ventilation apparatus.

SUMMARY

The present disclosure addresses the above-described concerns.

According to an aspect of the preset disclosure, a rotary door comprises a shaft defining an inner passage and having axial ends defining at least one end opening. The rotary door further comprises a deflector extending from the shaft. The shaft has a peripheral opening communicating with the at least one end opening through the inner passage.

According to another aspect of the preset disclosure, a ventilation apparatus comprises a case. The ventilation apparatus further comprises an evaporator accommodated in the case. The ventilation apparatus further comprises a rotary door rotatably supported by the case and located on a downstream side of the evaporator. The rotary door includes a shaft and a deflector. The shaft defines an inner passage and has axial ends defining at least one end opening. The deflector extends from the shaft. The shaft has a peripheral opening communicating with the at least one end opening through the inner passage. The peripheral opening is configured to be directed to the evaporator.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Embodiment

Figure 1:
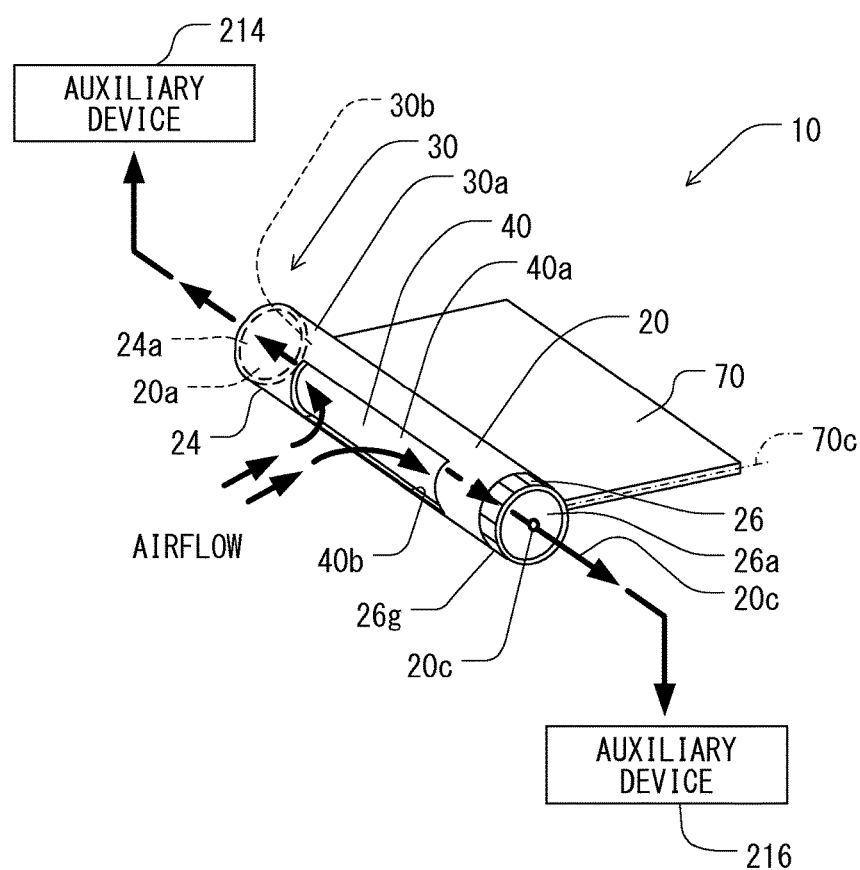
FIG. 1 is a perspective view showing a rotary door.

As follows, embodiments of the present disclosure will be described with reference to FIGS. 1 to 11. As shown in FIG. 1, a rotary door 10 is a flag style door including a shaft 20 and a deflector 70. The deflector 70 extends radially outward from the shaft 20. The shaft 20 is a hollow member in a tubular shape. In the present example, the shaft 20 is in a cylindrical shape to have a circular cross section. The shaft 20 extends along a center axis 20c. The shaft 20 has a tubular wall 30 extending in a circumferential direction. The tubular wall 30 has an outer periphery 30a and an inner periphery 30b. The inner periphery 30b defines an inner passage 20a extending along the center axis 20c.

The shaft 20 has two axial ends 24 and 26 on both sides of the center axis 20c. The inner passage 20a extends between the two axial ends 24 and 26. The two axial ends 24 and 26 define end openings 24a and 26a, respectively. The end openings 24a and 26a communicate with the inner passage 20a. The end openings 24a and 26a are connected to auxiliary devices 214 and 216 (FIG. 8), respectively. In the present example, one axial end 26 has an outer periphery defining a gear 26g.

The tubular wall 30 of the shaft 20 has a peripheral opening 40 in a rectangular shape. The peripheral opening 40 extends through the tubular wall 30 in a radial direction of the shaft 20. The peripheral opening 40 extends in the circumferential direction of the shaft 20 around the center axis 20c. The peripheral opening 40 opens in an opening angular range defined between a first perimeter 40a and a second perimeter 40b.

The peripheral opening 40 extends in an axial direction of the shaft 20 along the center axis 20c to have a certain length. The peripheral opening 40 is located between the axial ends 24 and 26. The peripheral opening 40 communicates with the end openings 24a and 26a through the inner passage 20a. In the present example, the peripheral opening 40 is opposed to the inner periphery 30b of the shaft 20.

The deflector 70 is in a rectangular plate shape. The deflector 70 extends radially outward from the outer periphery 30a of the shaft 20. The deflector 70 linearly extends perpendicularly to the center axis 20c of the shaft 20. The deflector 70 has a deflector center 70c along which the deflector 70 extends from the shaft 20. In the present example, the deflector 70 is located on the opposite side of the inner passage 20a from the peripheral opening 40.

The rotary door 10 may be integrally formed of resin by, for example, injection molding to include the shaft 20 and the deflector 70. The peripheral opening 40 and the end openings 24a and 26a may be formed by using slidable dies when the rotary door 10 is formed by injection molding. The shaft 20 may be formed separately from the deflector 70 and may be joined with the deflector 70. The peripheral opening 40 may be formed by, for example, cutting the tubular wall 30. The rotary door 10 may be formed of a material such as a metallic material other than resin.

The shaft 20 is configured to be rotatably supported at the axial ends 24 and 26. Thus, the deflector 70 is enabled to swing around the center axis 20c. The gear 26g is configured to be meshed with another gear and/or a link 114 (FIG. 8) to receive turning torque thereby to swing the deflector 70.

As shown by the arrows, fluid such as air flows through the peripheral opening 40 into the inner passage 20a. The airflow collides against the inner periphery 30b of the shaft 20. Thus, the airflow is deflected perpendicularly along the inner periphery 30b and divided into two flows to pass along the inner passage 20a. One of the divided two flows is directed toward one end opening 24a. Thus, the airflow is conducted through the one end opening 24a toward one auxiliary device 214. The other of the divided two flows is directed toward the other of end opening 26a. Thus, the airflow is conducted through the other end opening 26*a* to the other auxiliary device 216.

As follows, examples of the rotary door 10 will be described with reference to FIGS. 2 to 7. In the following description, a positive angle is in the counterclockwise direction in the drawing, and a negative angle is in the clockwise direction in the drawing.

In the examples of FIGS. 2 to 5 and 7, the rotary door 10 is rotatable around the center axis 20*c*. The rotation center corresponds to the deflector center 70*c* in the drawings. The rotary door 10 is rotatable in the rotative angular range between a positive limit position and a negative limit position. The rotation center is at the center between the positive limit position and the negative limit position. The solid line shows the rotary door 10 positioned at the rotation center. The dotted line shows the rotary door 10 positioned at the positive limit position after rotating counterclockwise from the rotation center. FIGS. 2 to 5 and 7 omits illustration of the rotary door 10 positioned at the negative limit position after rotating clockwise from the rotation center.

Figure 6:
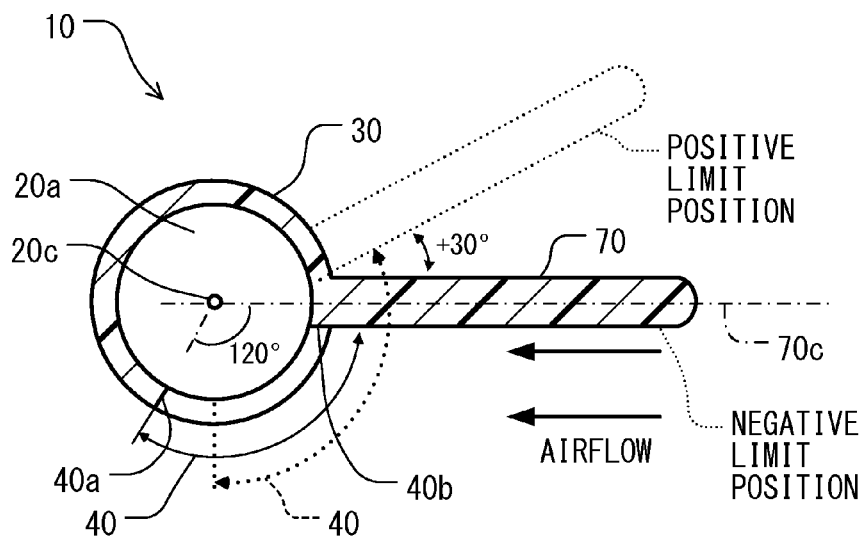

In the example of FIG. 6, the rotary door 10 is rotatable around the center axis 20*c* in the rotative angular range between the positive limit position and the negative limit position. The solid line shows the rotary door 10 positioned at the negative limit position after rotating clockwise from the rotation center. The dotted line shows the rotary door 10 positioned at the positive limit position after rotating counterclockwise from the rotation center.

First Example

Figure 2:
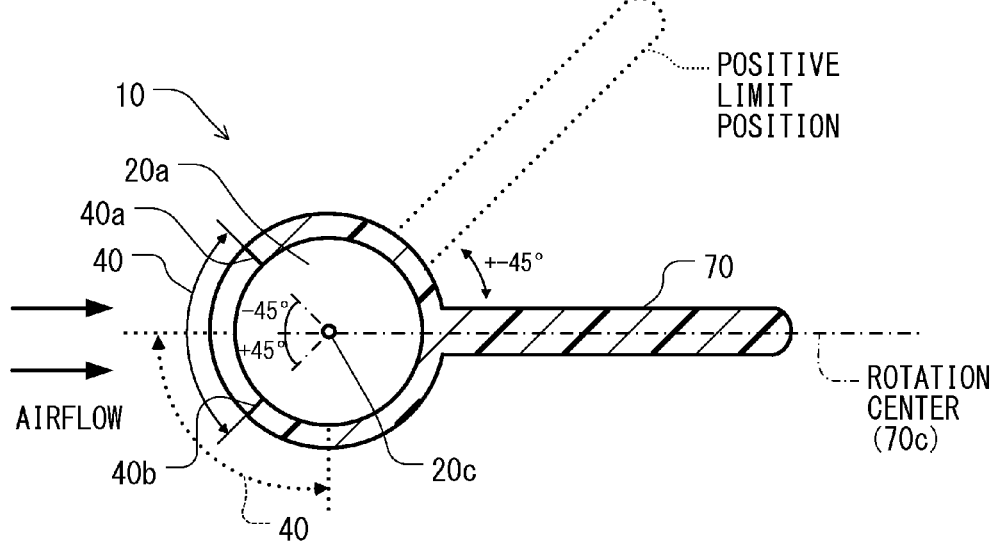
FIGS. 2 to 7 are sectional views showing examples of the rotary door.

In the first example of FIG. 2, the positive limit position is at +45 degrees from the rotation center, and the negative limit position (not shown) is at −45 degrees from the rotation center. That is, the rotary door 10 is rotatable by 45 degrees in both ways relative to the rotation center. That is, the rotative angular range is 90 degrees.

The first perimeter 40*a* is at −45 degrees from the rotation center, and the second perimeter 40*b* is at +45 degrees from the rotation center. The peripheral opening 40 has an opening angular range of 90 degrees. The peripheral opening 40 is on the opposite side of the inner passage 20*a* from the deflector 70. The peripheral opening 40 is symmetric relative to the rotation center.

As the rotary door 10 rotates, the peripheral opening 40 also rotates. When the rotary door 10 is at the positive limit position at +45 degrees, the first perimeter 40*a* is at 0 degree from the rotation center, and the second perimeter 40*b* is at +90 degree from the rotation canter. That is, in the present state, the peripheral opening 40 is on the lower left side in the drawing, and is still directed toward the airflow.

Second Example

Figure 3:
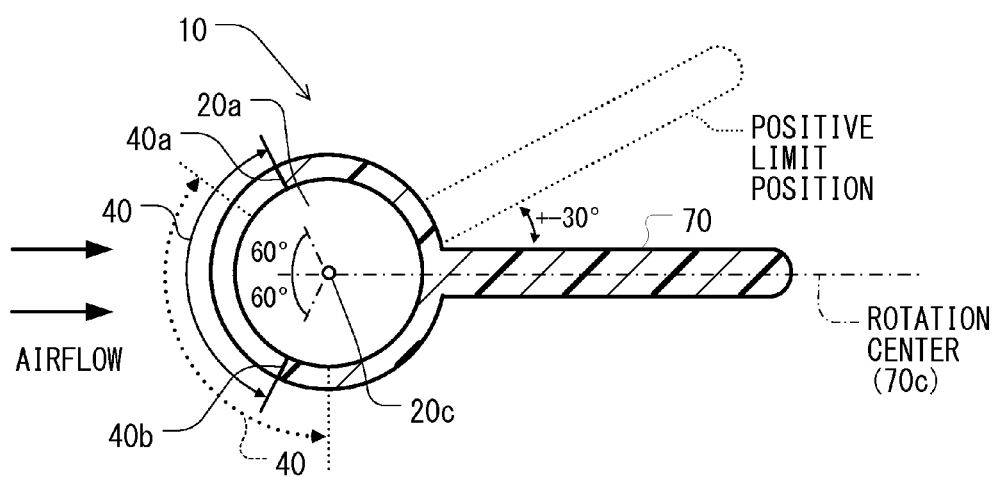

In the second example of FIG. 3, the positive limit position is at +30 degrees from the rotation center, and the negative limit position (not shown) is at −30 degrees from the rotation center. That is, the rotary door 10 is rotatable by 30 degrees in both ways relative to the rotation center. That is, the rotative angular range is 60 degrees.

The first perimeter 40*a* is at −60 degrees from the rotation center, and the second perimeter 40*b* is at +60 degrees from the rotation center. The peripheral opening 40 has an opening angular range of 120 degrees. The peripheral opening 40 is on the opposite side of the inner passage 20*a* from the deflector 70. The peripheral opening 40 is symmetric relative to the rotation center.

As the rotary door 10 rotates, the peripheral opening 40 also rotates. When the rotary door 10 is at the positive limit position at +30 degrees, the first perimeter 40*a* is at −30 degree from the rotation center, and the second perimeter 40*b* is at +90 degree from the rotation canter. That is, in the present state, the peripheral opening 40 is on the lower left side in the drawing, and is still directed toward the airflow.

Third Example

Figure 4:
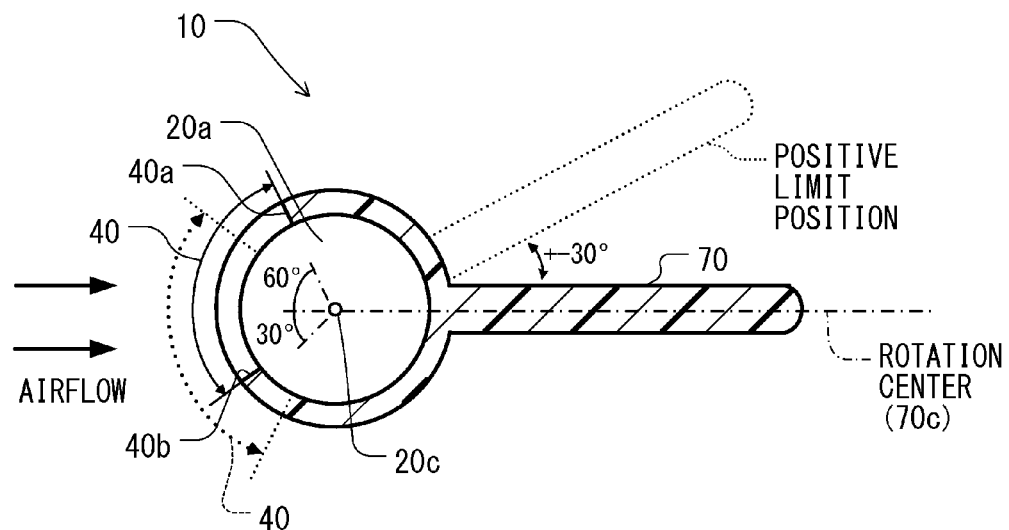

In the third example of FIG. 4, the rotary door 10 is rotatable by 30 degrees in both ways relative to the rotation center. That is, the rotative angular range is 60 degrees.

The peripheral opening 40 is offset in the negative angle relative to the rotation center. That is, the peripheral opening 40 is directed upward in the drawing. More specifically, the first perimeter 40*a* is at −60 degrees from the rotation center, and the second perimeter 40*b* is at +30 degrees from the rotation center. The peripheral opening 40 has an opening angular range of 90 degrees. The peripheral opening 40 is on the opposite side of the inner passage 20*a* from the deflector 70. The peripheral opening 40 is asymmetric relative to the rotation center.

As the rotary door 10 rotates, the peripheral opening 40 also rotates. When the rotary door 10 is at the positive limit position at +30 degrees, the first perimeter 40*a* is at −30 degree from the rotation center, and the second perimeter 40*b* is at +60 degree from the rotation canter. That is, in the present state, the peripheral opening 40 is still directed to the airflow.

Fourth Example

Figure 5:
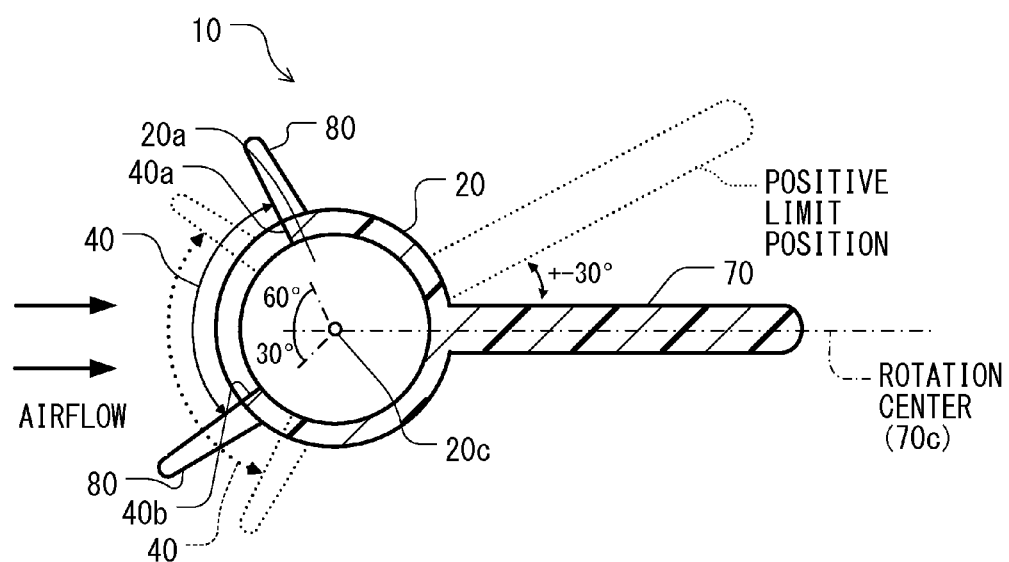

In the fourth example of FIG. 5, the shaft 20 may have auxiliary deflectors 80. Each of the auxiliary deflectors 80 extends radially outward from the outer periphery of the shaft 20. One of the auxiliary deflectors 80 is located around the first perimeter 40*a* of the peripheral opening 40. The other of the auxiliary deflectors 80 is located around the second perimeter 40*b* of the peripheral opening 40. More specifically, the auxiliary deflector 80 may extend along the corresponding one of the first and second perimeters 40*a* and 40*b*. The auxiliary deflector 80 and the corresponding one of the first and second perimeters 40*a* and 40*b* may have a continuous flat surface.

In the first to fourth examples of FIGS. 2 to 5, the deflector 70 is located on the opposite side of the inner passage 20*a* from the peripheral opening 40. The opening is directed toward the airflow to enable the airflow to pass through the peripheral opening 40 and the inner passage 20*a* toward the axial ends 24 and 26.

In the first to fourth examples of FIGS. 2 to 5, the positive limit position may be between 10 degrees and 90 degrees, the negative limit position may be between 10 degrees and 90 degrees, and the opening angular range of the peripheral opening 40 may be between 10 degrees and 180 degrees.

Fifth Example

In the fifth example of FIG. 6, the peripheral opening 40 is offset relative to the deflector center 70*c* and is located on one side of the deflector 70. The peripheral opening 40 is directed downward in the drawing. The deflector 70 is connected with the tubular wall 30 on the other side.

The positive limit position is at +30 degrees from the negative limit position, which is at 0 degrees. That is, the rotary door 10 is rotatable by 30 degrees in one way, and the rotative angular range is 30 degrees.

The first perimeter 40a is at −120 degrees from the negative limit position, and the second perimeter 40b is at 0 degree from the negative limit position. The peripheral opening 40 has an opening angular range of 120 degrees. The deflector 70 is located on the same side as the second perimeter 40b of the peripheral opening 40. In the present example, the deflector 70 is substantially located on the same side as the peripheral opening 40.

As the rotary door 10 rotates, the peripheral opening 40 also rotates. When the rotary door 10 is at the positive limit position at +30 degrees, the first perimeter 40a is at −90 degrees from the negative limit position, and the second perimeter 40b is at +30 degree from the rotation canter. That is, in the present state, the peripheral opening 40 is still directed to the airflow.

In the example of FIG. 6, the positive limit position may be between 10 degrees and 90 degrees, and the opening angular range of the peripheral opening 40 may be between 10 degrees and 180 degrees.

Sixth Example

Figure 7:
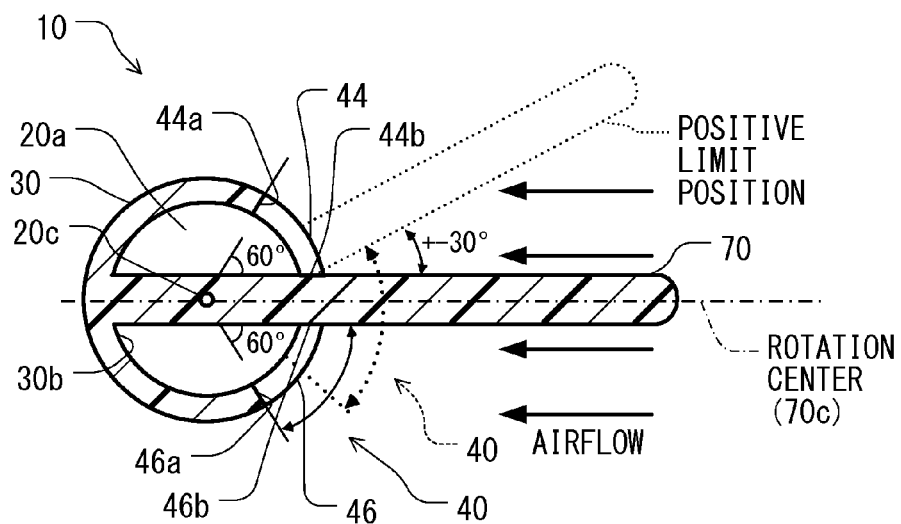

In the sixth example of FIG. 7, the rotary door 10 is rotatable by 30 degrees in both ways relative to the rotation center. That is, the rotative angular range is 60 degrees.

The tubular wall 30 has the peripheral openings 40 on both sides of the deflector 70. One of the peripheral openings 40 is a peripheral opening portion 46, which is offset relative to the rotation center and is located on one side of the deflector 70. The peripheral opening portion 46 is directed downward in the drawing.

The one peripheral opening portion 46 has a first perimeter 46a, which is at 60 degrees from the rotation center, and a second perimeter 46b, which is at 0 degree from the rotation center. The one peripheral opening portion 46 has an opening angular range of 60 degrees.

The other of the peripheral openings 40 is a peripheral opening portion 44, which is offset relative to the rotation center and is located on the other side of the deflector 70. The peripheral opening portion 44 is directed upward in the drawing.

The other peripheral opening portion 44 has a first perimeter 44a, which is at −60 degrees from the rotation center, and the second perimeter 44b, which is at 0 degree from the rotation center. The other peripheral opening portion 44 has an opening angular range of 60 degrees.

In the cross section of FIG. 7, the deflector 70 is separated from the tubular wall 30 on both sides in the circumferential direction. The deflector 70 is extended into the inner passage 20a and is connected with the inner periphery 30b of the tubular wall 30. That is, the deflector 70 partitions the inner passage 20a.

The deflector 70 is located on the same side as the second perimeters 44a and 44b of both the peripheral opening portions 44 and 46. In the present example, the deflector 70 is substantially located on the same side as the peripheral opening portions 44 and 46.

As the rotary door 10 rotates, the peripheral opening portions 44 and 46 also rotates. When the rotary door 10 is at the positive limit position at +30 degrees, the first perimeter 46a of the peripheral opening portion 46 is at −30 degrees from the rotation center, and the second perimeter 40b of the peripheral opening portion 46 is at +30 degree from the rotation canter. That is, in the present state, the peripheral opening portion 46 is still directed to the airflow.

In addition, when the rotary door 10 is at the negative limit position at −30 degrees, the first perimeter 44a of the peripheral opening portion 44 is at +30 degrees from the rotation center, and the second perimeter 44b of the peripheral opening portion 44 is at −30 degree from the rotation canter. That is, in the present state, the peripheral opening portion 44 is still directed to the airflow. That is, the rotary door 10 having both the peripheral opening portions 44 and 46 may enable the airflow to pass through one of the peripheral opening portions 44 and 46 when rotating in one of the two ways in the positive direction or the negative direction.

In the example of FIG. 7, at least one of the positive limit position, the positive limit position, and the opening angular range of the peripheral opening portion 46, and the opening angular range of the peripheral opening portion 44 may be between 10 degrees and 90 degrees.

The opening angular range may be determined such that both the peripheral opening 40 is directed to airflow in entire rotative angular range or in a part of rotative angular range. The first perimeter 40a or the second perimeter 40b of the peripheral opening 40 may be determined, such that the peripheral opening 40 is opposed to the airflow regularly in substantially entire rotative angular range. Specifically, the first perimeter 40a or the second perimeter 40b may be determined to be substantially at 90 degrees relative to the airflow direction when the rotary door 10 is at the positive limit position or at the negative limit position.

As follows, examples of application of the rotary door 10 will be described.

(First Application)

Figure 8:
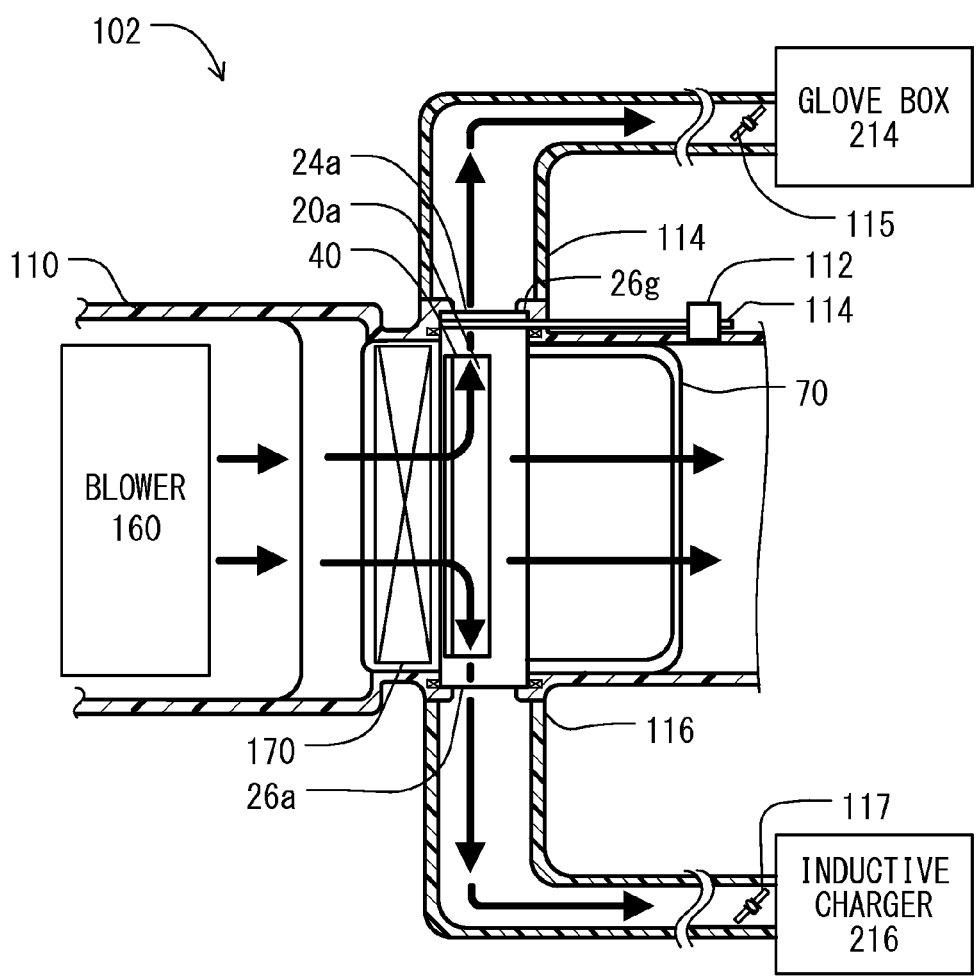
FIG. 8 is a top view showing a ventilation apparatus including the rotary door.
Figure 9:
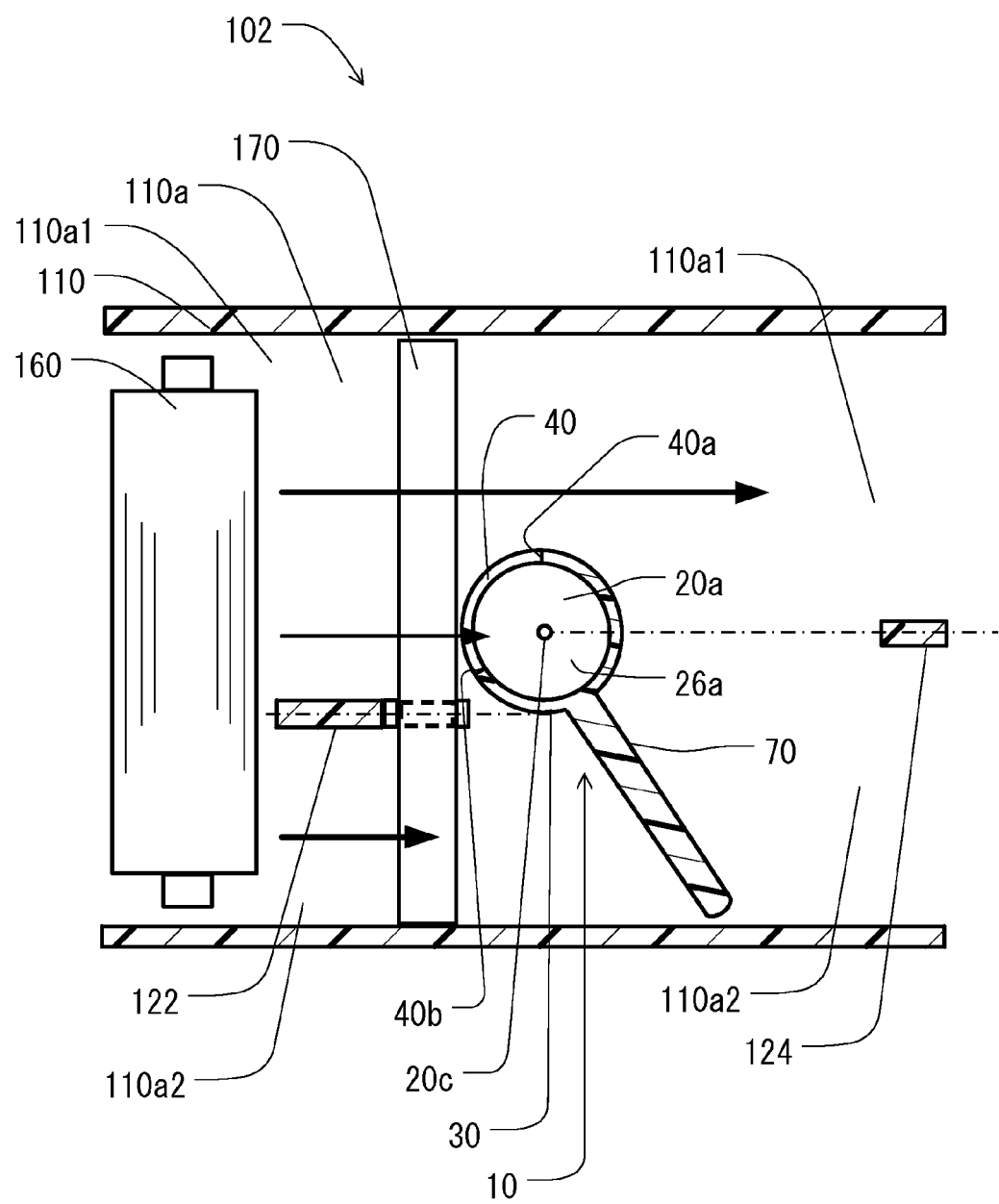
FIG. 9 is a side view showing the rotary door in a full close position.
Figure 10:
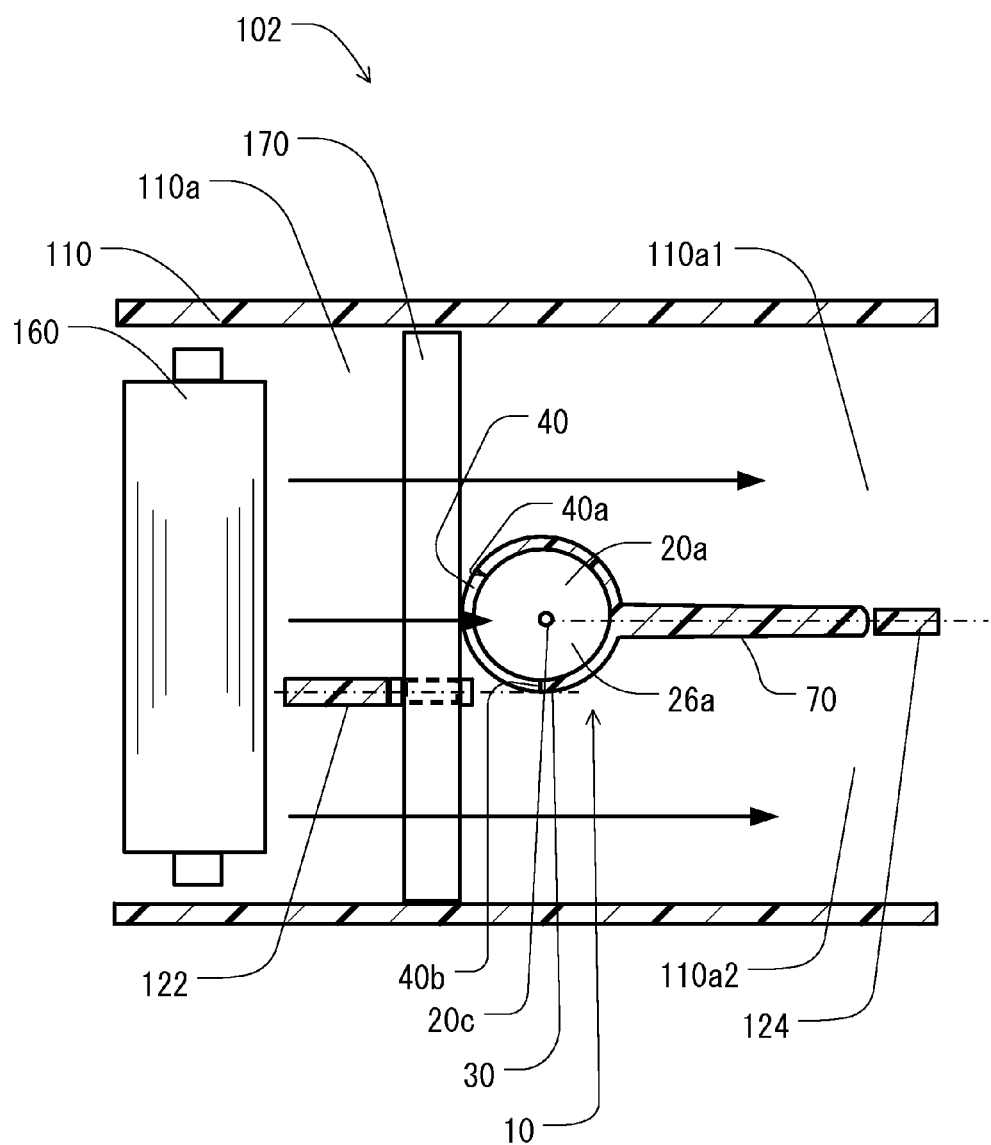
FIG. 10 is a side view showing the rotary door in a full open position.

As shown in FIGS. 8 to 10, the rotary door 10 is equipped to a ventilation apparatus 102. The ventilation apparatus 102 includes a case 110 accommodating a blower 160, an evaporator 170, and the rotary door 10. The evaporator 170 is a component of a refrigerant cycle (not shown) and connected with other components such as an expansion valve and a compressor (none shown).

In FIG. 8, the case 110 rotatably supports the rotary door 10. The case 110 is equipped with a motor 112 and a link 114. The link 114 is meshed with the gear 26g of the rotary door 10 and is coupled with the motor 112. The motor 112 is configured to drive the rotary door 10 via the link 114 to rotate the rotary door 10.

The case 110 defines a main passage 110a internally. The main passage 110a communicates with an outside of the case 110 through the peripheral opening 40, the inner passage 20a, and the end openings 24a and 26a of the rotary door 10.

The case 110 is connected with an auxiliary conduit 114 at one end opening 24a of the rotary door 10. The auxiliary conduit 114 is connected with a glove box 214 of the vehicle. The glove box 214 is one example of the auxiliary device 214. The auxiliary conduit 114 accommodates a valve 115. The valve 115 is configured to rotate to control airflow passing through the auxiliary conduit 114. The case 110 is further connected with an auxiliary conduit 116 at the other end opening 26a of the rotary door 10. The auxiliary conduit 116 is connected with an inductive charger 216 of the vehicle. The inductive charger 216 is one example of the auxiliary device 216. The auxiliary conduit 116 accommodates a valve 117. The valve 117 is configured to rotate to control airflow passing through the auxiliary conduit 116.

In FIGS. 9 and 10, the main passage 110a of the case 110 accommodates the blower 160, the evaporator 170, and the rotary door 10 in this order relative to a flow direction of airflow caused by the blower 160 in the case 110. The case 110 has an inlet partition 122 on the upstream side of the evaporator 170 to partition the main passage 110a into a first passage 110a1 and a second passage 110a2 on the upstream side of the evaporator 170. The inlet partition 122 may further partition a core of the evaporator 170 into two sections. The case 110 has an outlet partition 124 on the downstream side of the rotary door 10 to partition the main passage 110a into the first passage 110a1 and the second passage 110a2 on the downstream side of the rotary door 10. The first passage 110a1 may be conducted to a front passenger cabin of the vehicle. The second passage 110a2 may be conducted to a rear passenger cabin of the vehicle.

The blower 160 is driven by a motor (not shown) to blow air through the main passage 110a and the evaporator 170 toward the rotary door 10. Thus, the rotary door 10 is configured to receive, at the peripheral opening 40, the airflow after passing through the evaporator 170 and dehumidified through the evaporator 170. The rotary door 10 is rotatable between a full open position and a full close position to regulate a quantity of airflow through the second passage 110a2.

In FIG. 9, the rotary door 10 is at the full close position. When the rotary door 10 is at the full close position, a tip end of the deflector 70 is adjacent to a passage wall of the second passage 110a2 to close the second passage 110a2. Thus, the rotary door 10 allows air from the evaporator 170 to flow through the first passage 110a1 selectively. In the present state, the peripheral opening 40 of the rotary door 10 is directed to the airflow to conduct the airflow through the peripheral opening 40 and the inner passage 20a toward the auxiliary devices 214 and 216.

In FIG. 10, the rotary door 10 is at the full open position. When the rotary door 10 is at the full open position, the tip end of the deflector 70 is adjacent to the outlet partition 124 to open the second passage 110a2. Thus, the rotary door 10 allows air from the evaporator 170 to flow through both the first passage 110a1 and the second passage 110a2. In the present state, the peripheral opening 40 of the rotary door 10 is also directed to the airflow to conduct the airflow through the peripheral opening 40 and the inner passage 20a toward the auxiliary devices 214 and 216.

The outlet partition 124 is substantially at the same level as the center axis 20c of the rotary door 10. The inlet partition 122 is shifted from the center axis 20c of the rotary door 10 and is substantially at the same level as the periphery of the tubular wall 30 of the rotary door 10. More specifically, the outlet partition 124 wall has an outlet center, which is located substantially at the same level as the center axis 20c of the rotary door 10. The inlet partition 122 wall has an inlet center, which is located substantially at a same level as a tangential line of the tubular wall 30 of the rotary door 10. Therefore, in each of the full open position and the full close position, the inlet partition 122 may not obstruct the peripheral opening 40 of the rotary door 10.

The opening angular range of the peripheral opening 40 may be determined in consideration of the relative relationship between the rotary door 10 and the inlet partition 122 and the positive limit position and the negative limit position of the rotary door 10.

(Second Application)

Figure 11:
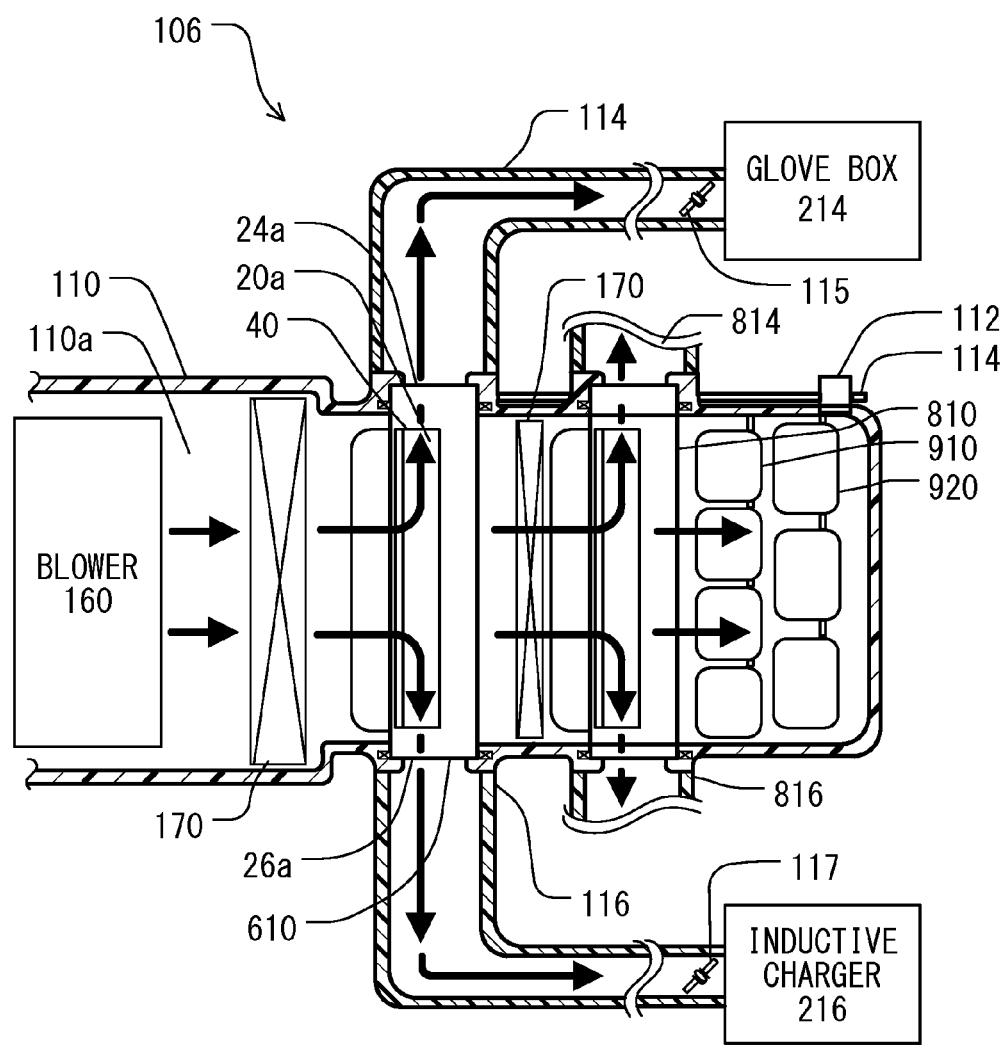
FIG. 11 is a top view showing an HVAC apparatus including the rotary door.
Figure 12:
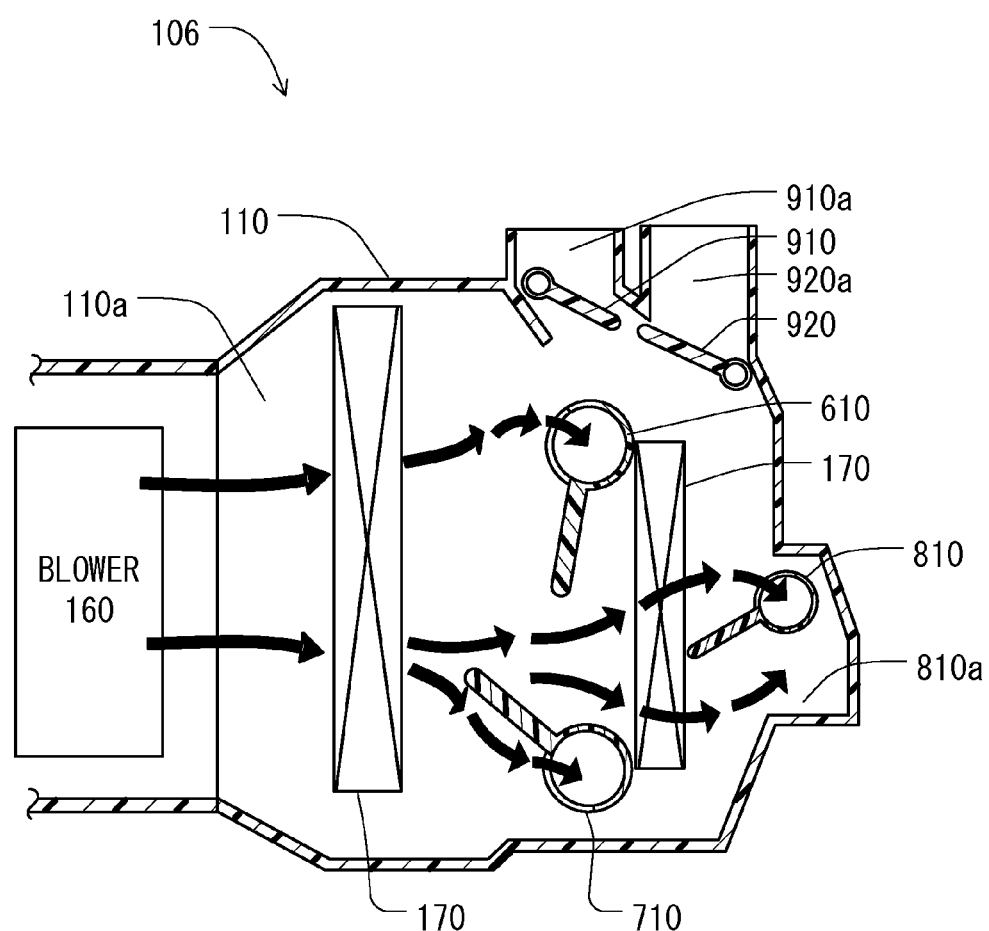
FIG. 12 is a side view showing the HVAC apparatus.

As shown in FIGS. 11 and 12, multiple rotary doors 610, 710, 810 are equipped in a heating, ventilation, and air conditioning apparatus (HVAC apparatus) 106, which is one example of a ventilation apparatus 102. The HVAC apparatus 106 includes a case 110 accommodating a blower 160, an evaporator 170, the rotary doors 610, 710, 810, and a heater 170.

In FIG. 11, the case 110 rotatably supports the rotary doors 610, 710, 810. The case 110 is equipped with the motor 112 and the link 114. The link 114 is meshed with gears of the rotary doors 610, 710, 810 and is coupled with the motor 112. The motor 112 is configured to drive the rotary doors 610, 710, 810 via the link 114 to rotate the rotary doors 610, 710, 810.

The case 110 defines a main passage 110a communicating with an outside of the case 110 through each of the rotary doors 610, 710, 810. The rotary doors 610, 710, 810 include heater doors 610 and 710. In FIG. 11, the heater door 610 is connected with the auxiliary devices 214 and 216 through the auxiliary conduits 114 and 116 to cool the auxiliary devices 214 and 216. The heater door 710 is connected with auxiliary devices similarly to the heater door 610. The rotary doors 610, 710, 810 further include a foot door 810 connected with auxiliary devices through auxiliary conduits 814 and 816 to heat the auxiliary devices.

In FIG. 12, the case 110 accommodates the blower 160, the evaporator 170, and the heater 170 in this order relative to the flow direction of the airflow in the case 110. In the present example, the heater doors 810 and 710 are equipped on the upstream side of the heater 170. In addition, one of the foot door 810 is equipped on the upstream side of a foot passage 810a.

The blower 160 is driven by a motor (not shown) to blow air through the main passage 110a and the evaporator 170 toward the heater doors 810 and 710 and the heater 170. Thus, the heater doors 810 and 710 are configured to receive, at the peripheral opening 40, the airflow after passing through the evaporator 170 and dehumidified through the evaporator 170.

When the heater doors 810 and 710 permit airflow through the heater 170, the airflow partially moves toward the foot door 810. Thus, the foot door 810 is configured to receive, at the peripheral opening 40, the airflow after passing through the heater 170 and heated through the heater 170.

The HVAC apparatus 106 further includes a defrost door (def door) 910 and a face door 920 equipped to a defrost passage (def passage) 910a and a face passage 920a, respectively. In the present example, any of the def door 910 and the face door 920 may employ the configuration of the rotary door 10.

Other Embodiment

The rotary door may have various configurations. For example, the opening angular range may be grater than 0 degree and may be less than 180 degrees. The opening angular range may be grater than 30 degree and may be less than 120 degrees.

The rotary door is not limited to the flag style door as exemplified above and may have various configurations. The shaft of the rotary door 10 may be used for, for example, a slidable door.

The auxiliary deflector of FIG. 5 may be employed in any of the above-described examples of the rotary door.

The peripheral opening is not limited to be in the rectangular shape. The peripheral opening may be in one of a circular shape, an oval shape and/or multiple slits.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A ventilation apparatus comprising:
a case defining a main passage of airflow internally;
an evaporator accommodated in the main passage of the case,
a rotary door rotatably supported by the case and located on a downstream side of the evaporator in the main passage of the case, and
an auxiliary conduit connected with the case and defining auxiliary passage of airflow discharged from the main passage of the case, wherein
the rotary door includes a shaft and a deflector,
the shaft includes a tubular wall that extends along a center axis and has a tubular shape, and the tubular wall defines an inner passage therein,
the deflector extends from the shaft in a radial direction,
the shaft has (i) an end opening that is formed in at least one of axial ends of the shaft and (ii) a peripheral opening that is formed in the tubular wall,
the inner passage is in fluid communication with the both end opening and the peripheral opening, and
the peripheral opening is configured to face the evaporator to draw a portion of the airflow passing through the main passage of the case, wherein
the auxiliary passage of the auxiliary conduit is in fluid communication with the inner passage of the shaft through the end opening of the rotary door,
the peripheral opening extends in a circumferential direction in an opening angular range, and
the shaft has a first perimeter and a second perimeter, which define the opening angular range therebetween.

2. The ventilation apparatus according to claim 1, wherein the case has a partition partitioning the main passage into a first passage and a second passage, and
the rotary door is rotatable selectively to close the second passage.

3. The ventilation apparatus according to claim 1, further comprising:
a heater located on a downstream side of the rotary door.

4. The ventilation apparatus according to claim 1, wherein the case has at least one of a def passage, a face passage, and a foot passage, and
the rotary door is configured to manipulate an opening of at least one of the def passage, the face passage, and the foot passage.

5. The ventilation apparatus according to claim 1, wherein the opening angular range is between 10 degrees and 180 degrees.

6. The ventilation apparatus according to claim 1, wherein the shaft is rotative in a rotative angular range between a positive limit position and a negative limit position, and
the peripheral opening is configured to be directed to airflow entirely in the rotative angular range.

7. The ventilation apparatus according to claim 1, wherein the shaft has an auxiliary deflector extending from an outer periphery of the tubular wall, and
the auxiliary deflector extends from a position around the peripheral opening.

8. The ventilation apparatus according to claim 1, wherein the deflector is located on the opposite side of the inner passage from the peripheral opening.

9. The ventilation apparatus according to claim 1, wherein the deflector is located on a same side as the peripheral opening.

10. The ventilation apparatus according to claim 9, wherein
the peripheral opening includes a plurality of peripheral opening portions located on a same side as the deflector.

11. The ventilation apparatus according to claim 10, wherein
the peripheral opening portions include two peripheral opening portions,
one of the peripheral opening portions is located on one side of the deflector, and
another of the peripheral opening portions is located on the other side of the deflector.

12. The ventilation apparatus according to claim 11, wherein
the deflector is extended through the inner passage and is connected to an inner periphery of the shaft.

13. The ventilation apparatus according to claim 1, wherein
the shaft has two end openings formed in both of the axial ends,
two auxiliary conduits are connected with the opposite ends of the case respectively, and
the auxiliary passage of the auxiliary conduits are in fluid communication with the inner passage of the shaft through the end openings of the rotary door in order that airflow passing through the peripheral opening to diverge in the inner passage and passing through the inner passage toward the auxiliary passages through the end openings.

* * * * *